United States Patent
Zhang et al.

(10) Patent No.: US 10,681,603 B2
(45) Date of Patent: Jun. 9, 2020

(54) METHOD AND NETWORK ELEMENT FOR HANDOVER OF USER PLANE TRAFFIC

(71) Applicant: Telefonaktiebolaget LM Ericsson (publ), Stockholm (SE)

(72) Inventors: Shunliang Zhang, Beijing (CN); Jian Wang, Beijing (CN); Zhiping Lei, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/081,545

(22) PCT Filed: Apr. 22, 2016

(86) PCT No.: PCT/CN2016/080000
§ 371 (c)(1),
(2) Date: Aug. 31, 2018

(87) PCT Pub. No.: WO2017/181408
PCT Pub. Date: Oct. 26, 2017

(65) Prior Publication Data
US 2019/0098545 A1    Mar. 28, 2019

(51) Int. Cl.
*H04W 36/12* (2009.01)
*H04W 36/22* (2009.01)
*H04W 36/00* (2009.01)

(52) U.S. Cl.
CPC .......... *H04W 36/12* (2013.01); *H04W 36/00* (2013.01); *H04W 36/0055* (2013.01); *H04W 36/22* (2013.01)

(58) Field of Classification Search
CPC . H04W 36/12; H04W 36/00; H04W 36/0055; H04W 36/22
See application file for complete search history.

(56) References Cited

U.S. PATENT DOCUMENTS

| | | |
|---|---|---|
| 2012/0320876 A1 | 12/2012 | Zhou et al. |
| 2014/0078898 A1 | 3/2014 | Anchan et al. |

(Continued)

FOREIGN PATENT DOCUMENTS

| | | |
|---|---|---|
| CN | 102123378 A | 7/2011 |
| CN | 102740268 A | 10/2012 |

OTHER PUBLICATIONS

"3GPP TR 22.891 V1.3.2", 3rd Generation Partnership Project; Technical Specification Group Services and System Aspects; Feasibility Study on New Services and Markets Technology Enablers; Stage 1 (Release 14), Feb. 2016, pp. 1-95.

(Continued)

*Primary Examiner* — Walli Z Butt
(74) *Attorney, Agent, or Firm* — Sage Patent Group

(57) ABSTRACT

The present disclosure proposes a method performed in a communication network (1) for handing over a user equipment (UE) (100) from a serving anchor node (202) to a target anchor node (212) for user plane traffic and a corresponding network element. The method comprises: transmitting to the target anchor node (212) a user addition request comprising at least an identifier of the UE (100); receiving from the target anchor node (212) a user addition response indicating that the target anchor node (212) is ready for handling the user plane traffic for the UE (100); and transmitting, to a Software Defined Networking Controller (SDNC) (301) which serves the UE (100), a downlink (DL) traffic steering request for steering DL user plane traffic for the UE (100) from the serving anchor node (202) to the target anchor node (212).

18 Claims, 4 Drawing Sheets

(56) References Cited

U.S. PATENT DOCUMENTS

2016/0112903 A1* 4/2016 Kaushik ............ H04W 28/0205
                                                                370/235
2016/0150448 A1* 5/2016 Perras .................. H04W 36/12
                                                                455/450
2019/0058767 A1* 2/2019 Chandramouli ........ H04L 67/10

OTHER PUBLICATIONS

"3GPP TR 23.714 V0.3.0", 3rd Generation Partnership Project; Technical Specification Group Services and System Aspects; Study on control and user plane separation of EPC nodes (Release 14), Feb. 2016, pp. 1-42.

* cited by examiner

METHOD AND NETWORK ELEMENT FOR HANDOVER OF USER PLANE TRAFFIC

TECHNICAL FIELD

The present disclosure generally relates to the field of telecommunication technology, and in particular, to a method and network element for handover of user plane traffic in a telecommunication network.

BACKGROUND

As expected by leading operators and vendors in NGMN (Next Generation Mobile Network) association, diverse applications or services are supposed to be provided by 5G networks. 5G will support numerous emerging use cases with a wide range of applications and variability of their performance requirements, for example, from delay-sensitive video applications to ultra-low latency, from high speed entertainment applications for use in a vehicle to mobility on demand for connected objects, and from best effort applications to reliable and ultra-reliable applications, such as those in the field of health and safety.

Furthermore, such diverse use cases will be delivered across a wide range of devices (e.g., smartphone, wearable, MTC (Machine Type Communications)) and across a highly heterogeneous environment. Obviously, different use cases may impose different requirements on future networks, for example, in terms of acceptable interruption time, reliability and availability, acceptable latency, data rate, as well as cost per user. It would be quite difficult or cost inefficient to deploy a common network to fulfill such extremely diverse requirements.

To resolve the problem, Ericsson proposed a concept of network slice to meet diverse requirements for various 5G use cases. Meanwhile, the concept of network slice is increasingly drawing attention in the NGMN association. A network slice supports a communication service of a particular connection type with a specific way of handling C(control)-plane and U(ser)-plane for the service.

In the IT industry, many OTT (Over-The-Top) service providers, such as Google, Apple, have already moved their applications onto a cloud infrastructure so that capacity of an application server can be flexibly scaled and dynamically deployed or migrated to a place that is more needed by users. Once an OTT application is deployed over the cloud, it is convenient for its OTT service provider to reselect an application server or move the application server workload across the distributed cloud infrastructure to serve mobile users in a more efficient manner.

To fulfill dynamic user requirements resulted from cloud based OTT applications, and also as inspired by great success of cloud technology in the IT world, the telecommunication industry is considering providing cloud based network services by the NFV (Network Function Virtualization) initiative at ETSI (European Telecommunication Standards Institute). NFV may transform the way that networks are built and operated by leveraging standard IT virtualization technology and consolidating various types of network equipments into "industry standard" servers. The NFV technology may make it more flexible and efficient to provide and operate a virtual mobile network service. With the quick development of cloud computing and NFV technology, it can be expected that more 5G network services will be deployed in a cloud environment in form of various network slices for agile operation and scaling to fulfill dynamic user requirements.

Meanwhile, as the penetration of various smart terminals (such as smart phone) and wearable devices (such as smart watch, Head Mounted Device (HMD)) increases worldwide and the interest in content-rich multi-media services (e.g. OTT video streaming services, virtual reality (VR), augmented reality (AR)) arises, this trend of rapidly increasing data traffic is expected to continue and accelerate. At the same time, there is a strong expectation to further improve the user experience of services like social networks, and to support vagarious use cases expected for 5G like Tactile Internet service.

SUMMARY

Lower latency is one of the KPIs (Key Performance Indicators) to meet for those services. Simply redistributing S/P-GW (Serving P-GW) and TDF (Traffic Detection Function) closer to a RAN (Radio Access Network) may resolve the above issues but may also increase the number of interfaces to other network entities like MME (Mobility Management Entity), PCRF (Policy and Charging Rule Function), and charging systems, resulting in an impact on network configuration and management. Therefore, 3GPP starts to study possibilities for a separation of S/P-GW and TDF functionality into user plane functions and control plane functions, so that the user plane functions can be located anywhere in a more flexible manner (e.g. centrally or closer to the RAN) while the control plane functions could still remain centralized and continue to support the interfaces to the other network entities (like MME, PCRF, Charging Systems).

In the context of a dynamic cloud based OTT application server (e.g. changing application server location), a dynamic user requirement (e.g. changing user location), and a flexible and dynamic virtual network service (e.g. changing network function location and capacity), one important issue is to ensure service continuation and therefore consistent user experience. This issue has been well resolved by 2G, 3G, and 4G mobile networks. It is expected that there is no exception for 5G mobile networks to fulfill the requirement by resolving related issues.

However, there is a problem in the existing network infrastructure. To facilitate understanding of the problem, the following use cases are described, and some of them are captured by 3GPP TR 22.891, which is incorporated herein by reference in its entirety.

Use Case 1: Data Path Optimization for Content Delivery

In the use case 1, it is assumed that a UE is receiving content from a CDN (Content Distribution Network) server A. At some point, the UE determines that its current IP anchor is not optimal due to the movement of the UE and that another CDN server B may be better in serving the UE. In this case, the system (or in particular, the UE, the current IP anchor, or any other network element) may decide to trigger the UE to establish an optimal PDN connection for the same service session using a different IP anchor node. However, when the IP anchor node is changed for the UE, there may be an interruption in the service, and it is desired that this interruption time is minimized.

Use Case 2: Application Server Change Due to UE Mobility

In the use case 2, it is assumed that a user's terminal executes an enterprise application, and an associated application service resides in one server close to the user. With the movement of the user, the service provider decides to transfer the application service to another server closer to the new location of the user than the previous one, thereby ensuring consistent user experience. Also, when the application server is changed for the user, there may be an interruption in the service, and it is desired that this interruption time is minimized.

Use Case 3: Service Continuation Between Moving Terminals

In the use case 3, it is assumed that terminals of two users (for example, Bob and Alice) connect to a network via a wireless access system. For example, Bob stays in his house, and Alice stays in a bus moving along a city road. Bob's terminal connects to a server hosted by a Service Provider X and requests to contact with Alice via a 3D Augmented Reality service. During the communication, the bus in which Alice resides keeps changing its location. As a result of the change of location, Alice's terminal may use different base stations to access the network, and therefore the IP anchor node for her terminal may also be changed.

Use Case 4: Dynamic Network Slice Termination and Instantiation

In the use case 4, it is assumed that a new network slice customized for a specific type of service/application is instantiated and an existing network slice has to be torn down. If the ongoing user traffic on the default existing slice is not handled appropriately, then user experience and network resource utilization efficiency couldn't be improved in time, and merit of the new network slice wouldn't be fully utilized.

If a network slice is preserved and instantiated at an early stage when the first user equipment is connected, and if the number of users increases slowly, then it would be a waste of resource and a challenge for network operators to make ends meet from practical business perspective. On the other hand, in a case where the size of a user group allocated to an existing dedicated network slice is decreasing to a certain extent, this active dedicated network slice customized for a specific type of service/application may be torn down because the economy of scale is lost. Further, if the ongoing user traffic on the dedicated slice is not handled appropriately while the dedicated slice is torn down, then user experience will be seriously impacted.

The common point of previous use cases is that the use plane, especially the P-GW (e.g. user mobility anchor point for a moving UE), needs to be changed during an active session of an application service. The reason of the changing may be due to network operation, application server change, or user movement. In previous 2G, 3G, and 4G core networks, it is assumed that the anchor point P-GW/GGSN (Gateway GPRS Support Node) will not be changed during the user movement. Therefore, the most essential issue is how to ensure service continuation during the procedure of changing the anchor point, or how to reduce negative impact to user experience due to possible service interruption. Further, another important issue is how to detect whether such a change is necessary or not, and If necessary how to select a better target anchor point (P-GW/GGSN) for a mobile user. In fact, relocation of user plane functional entity is identified as one of key issues in 3GPP CUPS (Control and User Plane Separation) study as captured by TR 23.714, which is incorporated herein by reference in its entirety.

A solution proposed by 3GPP (E)DÉCOR for dedicated core and Ericsson internal solution for network slice can direct a user to a specific dedicated core or network slice during his/her UE attaches to the network. For user equipments which have attached to a dedicated core or network slice, existing (E)DÉCOR solution cannot redirect existing user equipments to another network slice. In addition, in the existing 3GPP core network architecture, it is assumed that P-GW is the anchor point for user mobility. Therefore, there is no discussion about the relocation of P-GW for an active UE session. Existing handover procedure cannot handle the P-GW relocation issue. As part of 3GPP R14 work, the separation of control and user planes of EPC node study (TR 23.714) is kicked off, and related issues such as user plane functional entity relocation due to UE mobility is identified. Further, no specific solution for P-GW relocation is proposed so far.

In 3GPP SA1 (Service and System Aspects), related use cases and potential requirements for 5G networks have been roughly determined and captured in TR 22.891, which is incorporated herein by reference in its entirety. The discussion on 5G core architecture design principles to fulfill derived requirements are just kicked off, and so far no specific solution proposal to the aforementioned issue is put on the table of 3GPP.

In view of the above issues, the present disclosure proposes a method and network element for handover of user plane traffic in a telecommunication network.

According to a first aspect of the present disclosure, a method performed in a communication network for handing over a user equipment (UE) from a serving anchor node to a target anchor node for user plane traffic is provided. The method may comprise: transmitting to the target anchor node a user addition request comprising at least an identifier of the UE. The method may further comprise: receiving from the target anchor node a user addition response indicating that the target anchor node is ready for handling the user plane traffic for the UE. The method may also comprise: transmitting, to a Software Defined Networking Controller (SDNC) which serves the UE, a downlink (DL) traffic steering request for steering DL user plane traffic for the UE from the serving anchor node to the target anchor node.

Preferably, the method may further comprise: transmitting, to a Mobility Management Entity (MME) which serves the UE, an uplink (UL) traffic steering request for steering UL user plane traffic for the UE from the serving anchor node to the target anchor node. Preferably, before the transmission of the user addition request, the method may further comprise: determining whether the handover is necessary or not based on at least one of the current location of the UE, mobility history information of the UE, location information for an application server which is serving the UE, service requirements on latency, and an instruction from an Operations Support System (OSS)/Business Support System (BSS).

Preferably, before the transmission of the user addition request, the method may further comprise: determining the target anchor node based on at least one of the current location of the UE, mobility history information of the UE, location information for an application server which is serving the UE, service requirements on latency, and an instruction from an Operations Support System (OSS)/Business Support System (BSS). Preferably, the user addition request may further comprise at least one of: IP address of the UE, TEID allocated by the network element or the MME, and the IP address of the serving anchor node or a serving eNodeB of the UE.

Preferably, the traffic steering requests may comprise at least one of: IP address of the UE, TEID of the target anchor node, associated TEID of the serving anchor node, ID or IP address of the target anchor node, and description information for DL user plane traffic. Preferably, the method may further comprise: receiving, from the SDNC, a DL traffic steering response indicating that the DL user plane traffic has been steered to the target anchor node. Preferably, the method may further comprise: receiving, from the MME, a UL traffic steering response indicating that the UL user plane traffic has been steered to the target anchor node.

Preferably, after the transmission of the UL traffic steering request to the MME, the method may further comprise: transmitting to the serving anchor node a user deletion request comprising at least the identifier of the UE; and receiving from the serving anchor node a user deletion response indicating that the serving anchor node does not serve the UE any longer. Preferably, after the transmission of the UL traffic steering request to the MME and before the transmission of the user deletion request, the method may further comprise: receiving from the serving anchor node an indicator indicating that the handover is success.

Preferably, before the transmission of the user addition request, the method may further comprise receiving from another network element a relocation request for control plane traffic for the UE, and after the reception of the DL traffic steering response, the method may further comprise transmitting to the other network element a relocation response to indicate that the relocation is success.

Preferably, before the transmission of the user addition request, the method may further comprise receiving from the UE a Packet Data Network (PDN) connection request, and after the reception of the DL traffic steering response, the method may further comprise transmitting to the UE a PDN connection response to indicate that the handover is success.

Further, according to a second aspect of the present disclosure, a network element for handing over a user equipment (UE) from a serving anchor node to a target anchor node for user plane traffic is provided. The network element may be adapted to: transmit to the target anchor node a user addition request comprising at least an identifier of the UE. The network element may be further adapted to receive from the target anchor node a user addition response indicating that the target anchor node is ready for handling the user plane traffic for the UE. The network element may be further adapted to transmit, to a Software Defined Networking Controller (SDNC) which serves the UE, a downlink (DL) traffic steering request for steering DL user plane traffic for the UE from the serving anchor node to the target anchor node.

Further, according to a third aspect of the present disclosure, a network element for handing over a user equipment (UE) from a serving anchor node to a target anchor node for user plane traffic is provided. The network element may comprise: a processor; and a memory containing instructions which, when executed by the processor, causes the processor to: transmit to the target anchor node a user addition request comprising at least an identifier of the UE; receive from the target anchor node a user addition response indicating that the target anchor node is ready for handling the user plane traffic for the UE; and transmit, to a Software Defined Networking Controller (SDNC) which serves the UE, a downlink (DL) traffic steering request for steering DL user plane traffic for the UE from the serving anchor node to the target anchor node.

Further, according to a fourth aspect of the present disclosure, a computer program which, when executed by a processor, causes the processor to perform any of the methods of the first aspect is provided. Furthermore, according to a fifth aspect of the present disclosure, a computer program product comprising a computer program of the fourth aspect is provided.

Further, according to a sixth aspect of the present disclosure, an apparatus, implemented in a communication network, for handing over a user equipment (UE) from a serving anchor node to a target anchor node for user plane traffic is provided. The apparatus may comprise means for transmitting to the target anchor node a user addition request comprising at least an identifier of the UE. The apparatus may further comprise means for receiving from the target anchor node a user addition response indicating that the target anchor node is ready for handling the user plane traffic for the UE. The apparatus may further comprise means for transmitting, to a Software Defined Networking Controller (SDNC) which serves the UE, a downlink (DL) traffic steering request for steering DL user plane traffic for the UE from the serving anchor node to the target anchor node.

With the above method and network element, it is possible to reduce consumption of transmission resource and improve user experience by dynamic user plane path optimization. Further, the solution is effective in minimizing service interruption time during data-path optimization or change, which is important to improve user experience. Furthermore, the proposed architecture is consistent with the existing 3GPP network architecture, e.g. control plane and user plane separation and the evolution trend to 5G sliced networks. Also, the solution is simple and feasible from implementation perspective, e.g. only enhancement on existing interfaces and network functions.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Hereinafter, the present disclosure is described with reference to embodiments shown in the attached drawings. However, it is to be understood that those descriptions are just provided for illustrative purpose, rather than limiting the present disclosure. Further, in the following, descriptions of known structures and techniques are omitted so as not to unnecessarily obscure the concept of the present disclosure.

Further, as used herein, the term "user" may refer to not only a human user, but also a non-human user, such as a computer or any device that receives a request and respond to the request, for example.

Figure 1:
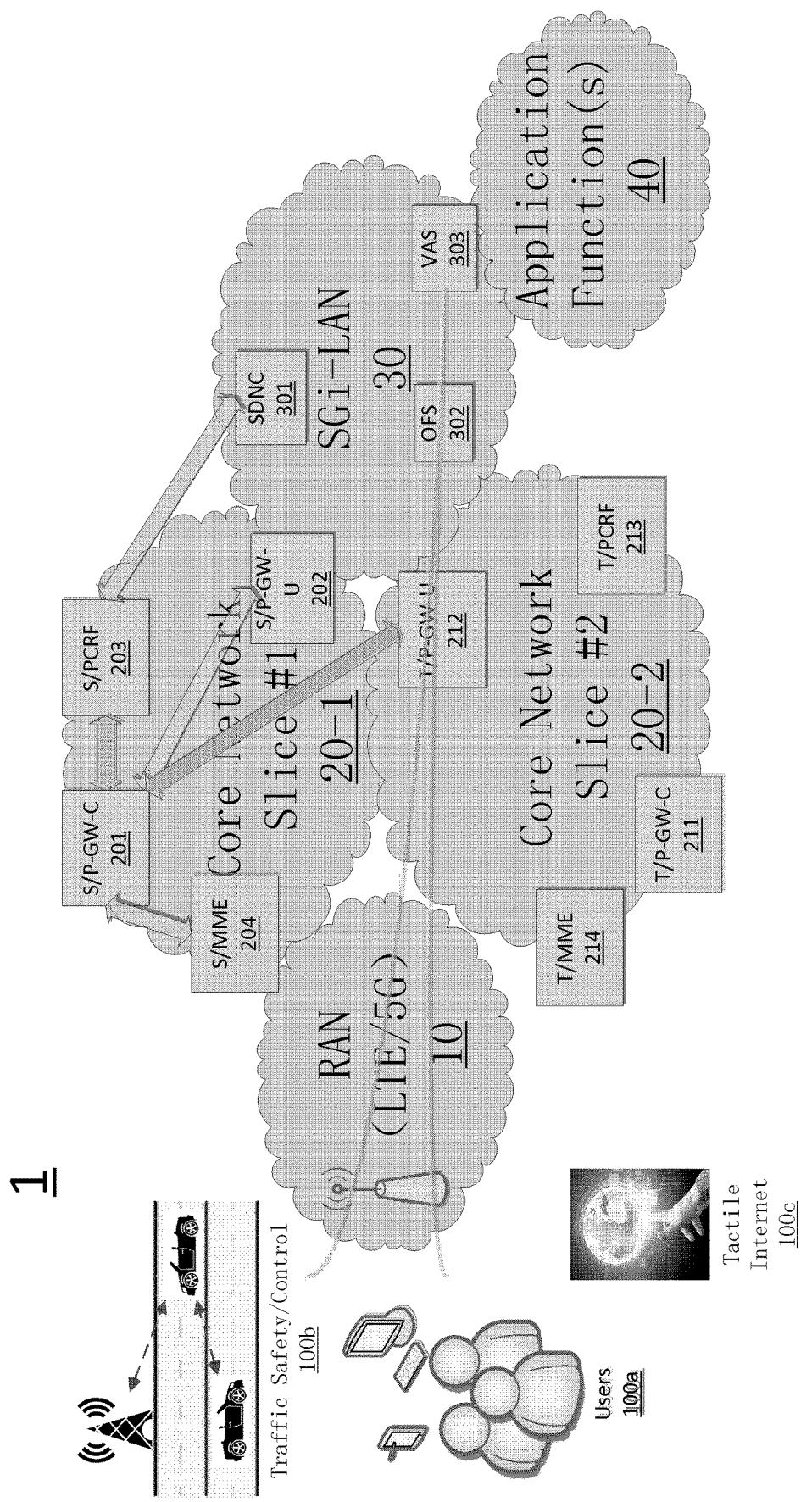
FIG. 1 is a diagram showing an exemplary system where a user plane anchor node for a user equipment can be changed according to an embodiment of the present disclosure.

FIG. 1 is a diagram showing an exemplary system 1 where a user plane anchor node for a user equipment can be changed according to an embodiment of the present disclosure. As shown in FIG. 1, the system 1 may comprise one or more user equipments 100, a Radio Access Network (RAN) 10, one or more Core Network (CN) Slices 20, an SGi-LAN 30, and one or more Application Functions (40).

Although only three types of user equipments, i.e. a user equipment 100a for daily use, a vehicle mounted user equipment 100b for traffic safety and control, and a user equipment 100c for use in the Tactile Internet (please refer to http://www.itu.int/en/ITU-T/techwatch/Pages/tactile-internet.aspx for details), are shown in FIG. 1, the user equipments are not limited thereto. The user equipments 100 may comprise at least one of a smart phone, a tablet PC, a desktop PC, a laptop PC, a wearable device (for example, a smart watch, an electronic bracelet, a Head Mounted Display, etc.), a vehicle infotainment system, or the like.

As shown in FIG. 1, the user equipments 100 accesses the rest of the system 1 via the RAN 10 which may comprise one or more base stations (BS), node B, or eNodeB. Though it is shown in FIG. 1 that the RAN 10 may be an LTE or 5G access network, the present disclosure is not limited thereto. The RAN 10 may be any access node/network using any access technology comprising but not limited to: GSM (Global System for Mobile communication)/GPRS (General Packet Radio Service), Code Division Multiple Access (CDMA), Wideband CDMA (WCDMA), CDMA-2000/1x, Time Division-Synchronous CDMA (TD-SCDMA), LTE/LTE-A, 5G, or the like. The RAN 10 provides the user equipments 100 with DL/UL transmission links which enable the user equipments 100 to access rest portions of the system 1.

The RAN 10 is connected to the core network slices 20 as shown in FIG. 1. Although only two slices 20-1 and 20-2 are shown in FIG. 1, the number of the slices is not limited thereto. In fact, the system 1 may comprise one or more network slices. Further, though it is shown in FIG. 1 that the slice #1 20-1 is separated from the core network slice #2 20-2, these slices 20 may actually are separated logically instead of physically. In other words, these two slices may be provided by same physical servers/nodes/elements, and therefore the links therebetween may not be a physical communication link, but rather means for data exchange, for example, read/write of a shared memory.

As shown in FIG. 1, the core network slice #1 20-1 may comprise at least a control plane P-GW (P-GW-C) 201, a user plane P-GW (P-GW-U) 202, a PCRF 203, and an MME 204. As also shown in FIG. 1, by prefixing respective names of the nodes in the slice 20-1 with letter "S" which represents "serving", the S/P-GW-C 201, the S/P-GW-U 202, the S/PCRF 203, and the S/MME 204 are nodes which are currently serving the user equipments 100.

Likewise, the core network slice #2 20-2 may comprise at least a control plane P-GW (P-GW-C) 211, a user plane P-GW (P-GW-U) 212, a PCRF 213, and an MME 214. As also shown in FIG. 1, by prefixing respective names of the nodes in the slice 20-2 with letter "T" which represents "target", the T/P-GW-C 211, the T/P-GW-U 212, the T/PCRF 213, and the T/MME 214 are nodes which are currently not serving the user equipments 100, and part or all of them are the target nodes for a partial or complete handover of the user equipments 100, as will be described below with reference to FIG. 2 and FIG. 3 in details.

The known reference point SGi is the reference point between the PDN GW and the packet data network. Packet data network may be an operator external public or private packet data network or an intra operator packet data network, e.g. for provision of IMS services. This reference point corresponds to Gi for 3GPP accesses. Therefore, the SGi-LAN 30 provides the core network slices 20, in turn, the RAN 10 and the user equipments 100, with an interface to the application functions 40 which reside in the local area network (LAN) of the service provides or operators. As shown in FIG. 1, the SGi-LAN 30 may comprise an SDNC 301, an OFS (Open Flow Switch) 302, and an optional VAS (Value Added Service) 303 which will be described below with reference to FIG. 2 and FIG. 3 in details.

Below, a general description of an embodiment of the present disclosure will be given with reference to FIG. 1. In general, the present embodiment proposes a network architecture in which a P-GW-C (for example, S/P-GW-C 201) selects a P-GW-U (for example, S/P-GW-U 202) for a user equipment and determines the relocation/handover of the P-GW-U (for example, from S/P-GW-U 202 to T/P-GW-U 212) for the user equipment based on various input information, such as the source/destination UE location and/or big data analytic result on its mobility history information, the location information of the application server (function), service requirement on latency, or the like.

In a case where the P-GW-C 201 decides that a P-GW-U relocation for a user is necessary, it may trigger the relocation process via a request message (a modified existing message or a new message) to a selected target P-GW-U 212 to add a new entry in the traffic forwarding table of the target P-GW-U 212. Once the new entry is established in the forwarding table of the target P-GW-U 212, the P-GW-C 201 may update the SDNC 301 with the new binding relation between the UE 100 and the target P-GW-U 212 directly or through an intermediate function like PCRF 203 via a message. The SDNC 301 may update the traffic steering policy for the user traffic on DL, e.g. steering related user DL traffic from the serving P-GW-U 202 to the target P-GW-U 212 based on the information from the P-GW-C 201. In addition, the P-GW-C 201 may update the UE-associated S-GW-C/MME 204 with the new binding relation between the UE 100 and the target P-GW-U 212 directly or through any other node via a request message. Based on the information received from the P-GW-C 201, the S-GW-C/MME 204 may identify related user traffic to be steered based on the TEID of the serving P-GW-U 202, and update the traffic steering policy for the user traffic on UL by providing the S-GW-U/ENB (or RAN 10) with the updated forwarding rules.

In another embodiment, in a case where the change of P-GW-C 201 is also necessary in addition to the relocation of P-GW-U, the serving P-GW-C 201 may send a request message to a selected target P-GW-C 211 to provide UE related context, and trigger the target P-GW-C 211 to prepare for accommodating the existing UE sessions. Once the UE 100 is handed over to the target network slice #2 20-2, the target P-GW-C 211 may reply the serving P-GW-C 201 with a response message to confirm that the related UE context has been received and handover is successful. The serving P-GW-C 201 may release all UE related context and resource in the serving network slice #1 20-1.

Please note that since there is no existing solution for the above issues, and therefore the messages used herein may be brand new messages or modified version of the existing messages. For example, as mentioned above, the relocation request message transmitted from the P-GW-C 201 to the target P-GW-U 212 and/or the target P-GW-C 211 could be a completely new message or a modified existing message.

To be more specific, two typical scenarios will be described below.

Scenario A: User Plane Anchor Node Changes while Control Plane Anchor Node Remains the Same 1. A serving P-GW-C 201 is proposed to determine if a relocation of P-GW-U is necessary or not, and if necessary, to select a new P-GW-U for the UE 100. To make a correct decision, the serving P-GW-C 201 may take at least one of following information into account (but not limited to): the source/destination UE location and/or big data analytic result on mobility history info, the location information of AF 40, the service requirement on latency, or information from OSS (Operation Supporting System)/BSS (Business Supporting System) systems.

2. In a case where the serving P-GW-C 201 decides P-GW-U relocation for the UE 100 is necessary, it will trigger the relocation process via a request message to a selected target P-GW-U 212 to add a new entry in the traffic forwarding table of the target P-GW-U 212. The message may comprise at least one of: UE IP address, TEID allocated by S-GW-C/MME 204 or ENB, and the IP address of S-GW-U or ENB.

3. Once the new entry is established in the forwarding table of the target P-GW-U 212, the P-GW-C 201 may update an SDNC 301 with the new binding relation between the UE 100 and the target P-GW-U 212 directly or through an intermediate function, such as PCRF 203 via a message. The message may include at least one of following information: the UE 100's IP address, related DL user traffic description information, ID/IP address of the associated target P-GW-U 212. The DL/UL traffic description information may comprise (but not limited to): QoS-related information (such as, GBR (Guaranteed BitRate), non-GBR), delay, bandwidth, etc.

4. Based on the information received from the serving P-GW-C 201, the SDNC 301 may update the traffic steering policy for the user DL traffic, e.g. steering related user DL traffic from the serving P-GW-U 202 to the target P-GW-U 212, by providing controlled OFS 302 with the updated forwarding rules which includes at least one of (but not limited to): ID/IP of the target P-GW-U 212 and DL user traffic description information. Then, the SDNC 301 may reply the serving P-GW-C 201 with a response message to inform that the related DL user traffic has been switched to the target P-GW-U 212.

5. In addition, the serving P-GW-C 201 may update the UE associated S-GW-C/MME 204 with the new binding relation between the UE 100 and the target P-GW-U 212 via a request message. The message may comprise at least one of the following information (but not limited to): the UE 100's IP address, TEID of the target P-GW-U 212, ID or IP address of the associated target P-GW-U 212, and associated TEID of the serving P-GW-U 202.

6. Based on the information received from the serving P-GW-C 201, the S-GW-C/MME 204 may identify user traffic to be switched, for example, based on the TEID of the serving P-GW-U 202, and update the traffic steering policy for the user UL traffic by providing the S-GW-U/ENB with the updated forwarding rules which may comprise at least one of (but not limited to): ID/IP of the target P-GW-U 212, TEID of the target P-GW-U 212, UL user traffic description information. Then the S-GW-C/MME 204 may reply the P-GW-C 201 with a response message to inform that the UL user traffic has been switched to the target P-GW-U 212.

7. If no response is received from the serving P-GW-U 202 and the timer started in advance (e.g. by the P-GW-C 201 upon receipt of the response from the target P-GW-U 212) is expired, the P-GW-C 201 may instruct the serving P-GW-U 202 to delete the UE-related forwarding entry in its forwarding table.

In this scenario, the user plane traffic of the user equipments 100 may be routed through the target P-GW-U 212 rather than the serving P-GW-U 202 while the control plane traffic is stilled routed through the serving P-GW-C 201. In this way, the user equipments 100 may experience a faster handover.

Scenario B: Both of User Plane and Control Plane Anchor Nodes Change

1. A serving P-GW-C 201 is proposed to determine if a relocation of P-GW-C is necessary or not. If the P-GW-C relocation is necessary, the serving P-GW-C 201 may select a target P-GW-C 211 to serve the UE 100 based on various input information as mentioned above.

2. In a case where the relocation of P-GW-C is necessary, the serving P-GW-C 201 may inform the selected target P-GW-C 211 of the P-GW-C relocation via a message with UE related context (such as UE security context, QoS context, UE mobility history context, and/or application related context) to assist the target P-GW-C 211 in selecting a target P-GW-U 212.

3. After selecting the target P-GW-U 212, the target P-GW-C 201 may send a request message to its upstream SDNC 301 directly or indirectly via an intermediate network function like PCRF 213 to establish a DL traffic steering policy for the UE 100. The message may comprise at least one of following information (but not limited to): IP address allocated to the UE 100 by the target P-GW-C 211, ID/IP address of the target P-GW-U 212 selected for the UE 100, and related traffic description information.

4. Based on the information received from the target P-GW-C 211, the SDNC 301 may install a DL traffic steering policy to a controlled OFS 302 to steer the UE related traffic to the target P-GW-U 212, and the SDNC 301 may reply the target P-GW-C 211 with a response message to confirm that the related user traffic has been steered to the target P-GW-U 212.

5. Upon receipt of the response message from the SDNC 301 and/or the request information from the UE 100, the target P-GW-C 211 may reply the serving P-GW-C 201 with a response message to confirm that the related UE context has been received and handover is successful.

6. After receipt of the response message from the target P-GW-C 211, the serving P-GW-C 201 may instruct the serving P-GW-U 202 to delete the UE related forwarding entry, and the P-GW-C 201 may release the UE related context and resource allocated.

7. In addition, the serving P-GW-C 201 may send a request message to its upstream SDNC 301 directly or indirectly via an intermediate network function like PCRF 203 to release the DL traffic steering policy for the UE 100. The message may comprise at least one of following information (but not limited to): UE 100's IP address allocated by the serving P-GW-C 201, ID/IP address of the serving P-GW-U 202, and related traffic description information. Based on the information received from the serving P-GW-C 201, the SDNC 301 may instruct the controlled OFS 302 (or another OFS which serves for the UE 100 before the relocation) to delete the UE DL traffic steering policy.

In this scenario, the user plane traffic of the user equipments 100 may be routed through the target P-GW-U 212 rather than the serving P-GW-U 202 while the control plane traffic may be routed through the target P-GW-C 211 rather than the serving P-GW-C 201. In this way, both of the control plane traffic and the user plane traffic can be handed over to new anchor nodes which are more appropriate for the user equipments. Further, the proposed architecture is consistent with the existing 3GPP network architecture, e.g. control plane and user plane separation and the evolution trend to 5G sliced networks. Also, the solution is simple and feasible from implementation perspective, e.g. only enhancement on existing interfaces and network functions.

Next, a more detailed description of the above two scenarios will be given below with reference to FIG. 2 and FIG. 3, respectively. As clear from the description, the messages involved in FIG. 2 and FIG. 3 may be modified existing messages or new messages for the purpose of the present disclosure. For the purpose of simplicity, the following non-limiting description is given with respect to the new messages and shall not be construed as limiting the present disclosure.

Figure 2:
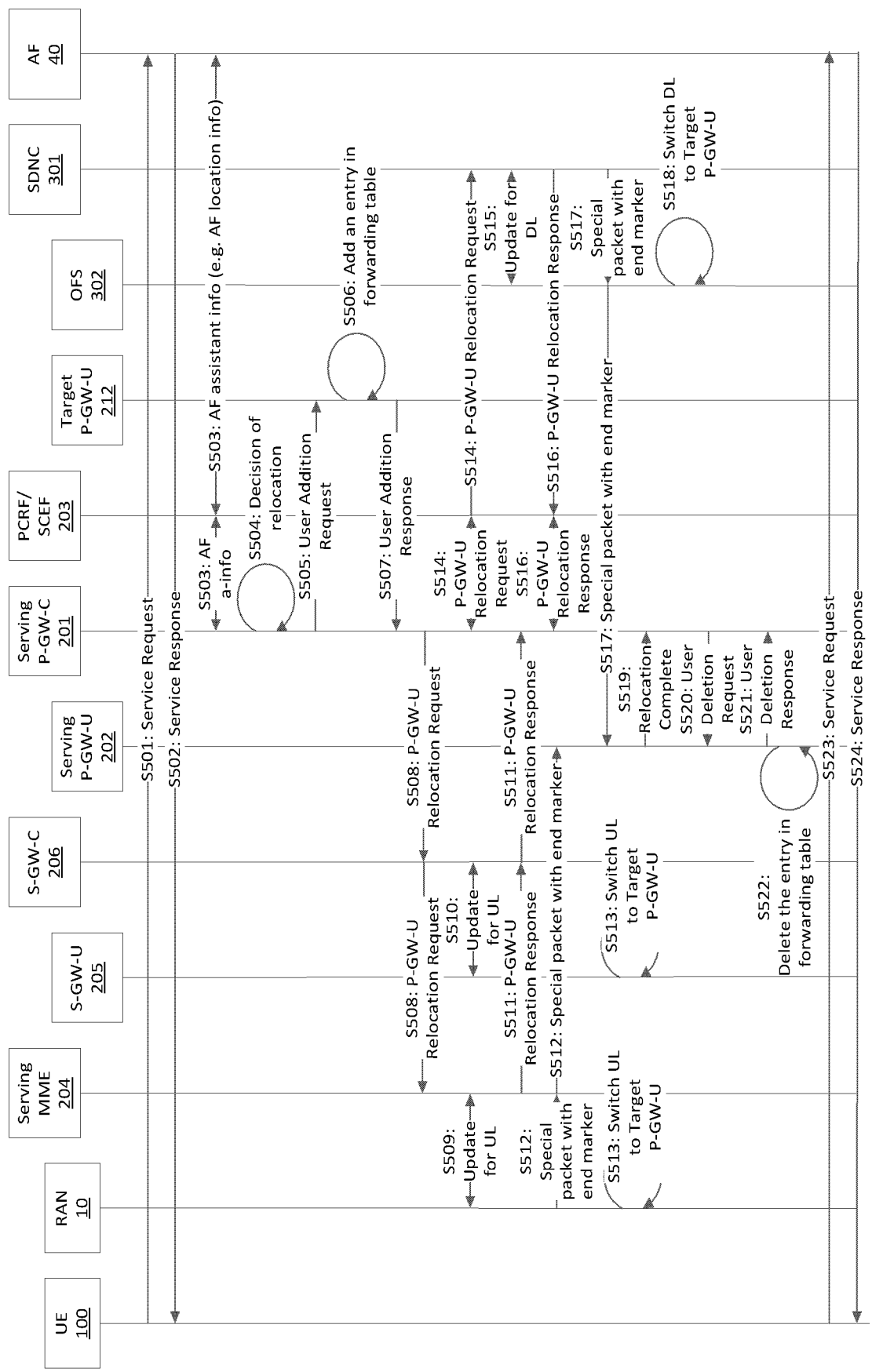
FIG. 2 is a diagram showing an exemplary message flow among various entities in a handover procedure for user plane only in the system shown in FIG. 1.

FIG. 2 is a diagram showing an exemplary message flow among various entities in a handover procedure for user plane only in the system 1 shown in FIG. 1. The process begins with the step S501. At the step S501, through bearers established with serving user plane function, the UE 100 may send an application layer service request, such as an HTTP request, to the application function (AF, such as tactile internet application server) 40 to require certain information. At the step S502, the application server 40 may reply the UE 100 with an application layer response message to provide required information.

At the step S503, the serving P-GW-C 201 may subscribe the AF location information by interaction with the AF 40 and/or the application system controller (such as a CDN controller) directly or indirectly via an intermediate function (such as PCRF 203 and/or SCEF (Service Capability Exposure Function)). The AF function 40/application system controller (like CDN controller) may actively or passively inform the P-GW-C 201 of its location information directly or indirectly via the intermediate function like PCRF 203 and/or SCEF upon new session establishment or AF relocation for a mobile user or the UE 100.

At the step S504, based on various input information (such as the source/destination UE location, big data analytic result on mobility history info, the location information of the AF 40, and/or the service requirement on latency), the serving P-GW-C 201 may determine if a relocation/handover of P-GW-U is necessary or not, and if necessary, it may select a target P-GW-U 212 for the UE 100. At the step S505, in a case where the P-GW-C 201 decides that the relocation of P-GW-U for the UE 100 is necessary, it may trigger the relocation process via a request message (for example, a user addition request message) to the selected target P-GW-U 212 to add a new entry in the traffic forwarding table of the target P-GW-U 212. The message may comprise at least one of (but not limited to): UE 100's IP address, TEID allocated by S-GW-C or MME 204, and the IP address of S-GW-U or ENB (or RAN 10).

At the step S506, based on the information received from the P-GW-C 201, the target P-GW-U 212 may add a new forwarding entry in its forwarding table for the user traffic. At the step S507, the target P-GW-U 212 may reply the serving P-GW-C 201 with a message to confirm that the related information has been received and the forwarding rules have been installed for the user traffic. In other words, a user addition response message indicating that the target P-GW-U 212 is ready for handling the user plane traffic for the UE 100 is transmitted from the target P-GW-U 212 to the serving P-GW-C 201.

At the step S508, the serving P-GW-C 201 may update the UE-associated S-GW-C 206 and/or MME 204 with the new binding relation between the UE 100 and the target P-GW-U 212 directly via a request message. The message may comprise at least one of (but not limited to) following information: the UE 100's IP address, TEID of the target P-GW-U 212, associated TEID of the serving P-GW-U 202, and ID or IP address of the associated target P-GW-U 212. At the steps S509 and S510, based on the information received from the P-GW-C 201, the S-GW-C 206 and/or MME 204 may identify specific user traffic to be switched based on the TEID of the serving P-GW-U 202, and update traffic steering policy for the user UL traffic by providing the S-GW-U 205 and/or eNB (or RAN 10) with the updated forwarding rules which may comprise at least one of the following information (but not limited to): the ID/IP of the target P-GW-U 212, the TEID of the target P-GW-U 212, and the UL user traffic description information.

At the step S511, the S-GW-C 206 and/or MME 204 may reply the P-GW-C 201 with a response message to inform that the UL user traffic has been switched to the target P-GW-U 212. At the step S512, the S-GW-C 206 and/or MME 204 may generate or instruct the S-GW-U 205 and/or eNB (or RAN 10) to generate a special UL packet with an end marker as the last packet to the serving P-GW-U 202 before instructing the S-GW-U 205 and/or eNB (or RAN 10) to redirect remaining UL traffic to the target P-GW-U 212. Then, the S-GW-U 205 and/or eNB (or RAN 10) may send the special UL packet with the end marker as the last packet to the serving P-GW-U 202 before redirecting the remaining UL traffic to the target P-GW-U 212. At the step S513, the S-GW-U 205 and/or eNB (or RAN 10) may switch the remaining UL traffic to the target P-GW-U 212.

Meanwhile, at the step S514, the P-GW-C 201 may update the SDNC 301 with the new binding relation between the UE 100 and the target P-GW-U 212 directly or indirectly through an intermediate function (such as PCRF 203) via a message. The message may comprise at least one of the following information (but not limited to): the UE 100's IP address, the related DL user traffic description information, and ID/IP address of the associated target P-GW-U 212. At the step S515, based on the information received from the P-GW-C 201, the SDNC 301 may update the traffic steering policy for the user DL traffic, e.g. steering related user DL traffic from the serving P-GW-U 202 to the target P-GW-U 212, by providing the OFS 302 with the updated forwarding rules which may comprise at least one of (but not limited to): the ID/IP address of the target P-GW-U 212 and the DL user traffic description information.

At the step S516, the SDNC 301 may reply the P-GW-C 201 with a message to confirm that the related information has been received and the DL traffic has been successfully switched to the target P-GW-U 212. In addition, at the step 517, the SDNC 301 may generate or instruct the OFS 302 to generate a special DL packet with an end marker as the last packet to the serving P-GW-U 202 before instructing the OFS 302 to redirect the remaining DL traffic to the target P-GW-U 212. Then, the OFS 302 may send the special DL packet with the end marker as the last packet to the serving P-GW-U 202 before redirecting the remaining DL traffic to the target P-GW-U 212. At the step S518, the OFS 302 may switch the remaining DL traffic to the target P-GW-U 212. At the step S519, after receipt of the special DL packet with the end marker and/or the special UL packet with the end marker, or upon a timer started previously is expired, the serving P-GW-U 202 may inform its associated P-GW-C 201 that the relocation is over and the UE related forwarding entry will be deleted. At the step S520 and the step S521, the P-GW-C 201 may update user context information (the associated P-GW-U 202) and reply the serving P-GW-U 202 with a message to confirm that the relocation is finished and inform the serving P-GW-U 202 to delete the UE related forwarding entry in the forwarding table. At the step S522, based on the instruction received from the P-GW-C 201, the P-GW-U 202 may remove the UE-related entry from its forwarding table.

At the step S523, through the bearers established with the target user plane function, e.g. the target P-GW-U 212, the UE 100 may send an application layer service request (such as an HTTP request) to require certain information from the application server 40 or report certain information to the application server 40 (such as tactile internet application server). At the step S524, the application server 40 may reply the UE 100 with an application layer response message to provide the information as required.

In this embodiment of FIG. 2, the user plane traffic of the user equipments 100 may be routed through the target P-GW-U 212 rather than the serving P-GW-U 202 while the control plane traffic is stilled routed through the serving P-GW-C 201. In this way, the user equipments 100 may experience a faster handover.

Figure 3:
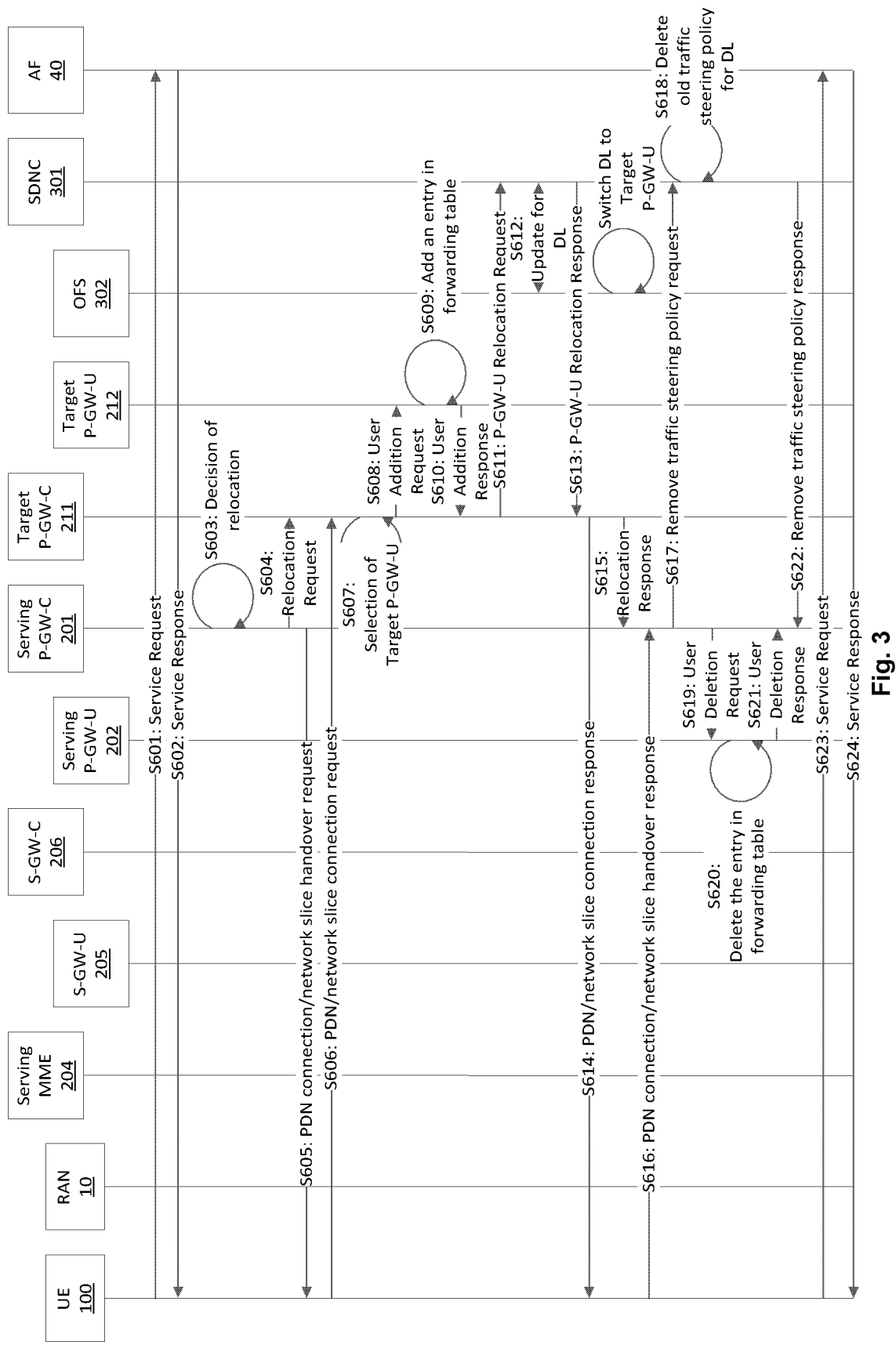
FIG. 3 is a diagram showing an exemplary message flow among various entities in a handover procedure for both of user plane and control plane in the system shown in FIG. 1.

FIG. 3 is a diagram showing an exemplary message flow among various entities in a handover procedure for both of user plane and control plane in the system 1 shown in FIG. 1. The process begins with the step S601. At the step S601, through the bearers established with the serving user plane function (for example, the serving P-GW-C 201 and P-GW-U 202), the UE 100 may send an application layer service request (such as an HTTP request) to require certain information from the application server 40 (such as a tactile internet application server). At the step S602, the application server 40 may reply the UE 100 with an application layer response message to provide required information.

At the step S603, based on various input information (such as the source/destination UE location, big data analytic result on mobility history information, the location information of the AF 40, the service requirement on latency, and/or instruction from OSS/BSS system), the serving P-GW-C 201 may determine whether a relocation/handover of P-GW-U and/or a change of P-GW-C is necessary or not, and if necessary, select a target P-GW-C 211 for a UE 100.

At the step S604, in a case where the change of P-GW-C is necessary, the serving P-GW-C 201 may inform the selected target P-GW-C 211 of the P-GW-C relocation via a message comprising UE related context information (such as UE security context, QoS context, UE mobility history context, and/or application related context) to assist the target P-GW-C 211 in selecting a target P-GW-U 212. Meanwhile, at the step S605, the serving P-GW-C 201 may initiate a network slice or PDN connection handover process via a request message to the UE 100 through some intermediate core network and/or RAN C-plane function(s). The message may comprise at least one of (but not limited to): the cause for the handover/relocation, the target network slice type/ID, and/or the ID/IP of the target P-GW-C 211, and related user traffic for handover.

At the step S606, as instructed by the network side (for example, the serving P-GW-C 201), the UE 100 may initiate a new PDN connection with the target network slice #20-2 via a connection request message to the target P-GW-C 211 before terminating the existing connection with the serving network slice #20-1 or serving P-GW-C 201. At the step S607, after receipt of the connection request message, the target P-GW-C 211 may select an appropriate target P-GW-U 212 for the UE 100 based on the UE 100's location and/or the UE related context information as provided by the serving P-GW-C 201.

At the step S608, the target P-GW-C 211 may send a request message to the selected target P-GW-U 212 to add a new entry in its traffic forwarding table. The message may comprise at least one of (but not limited to): IP address of the UE 100, TEID allocated by the target S-GW-C 211 or the eNB (or RAN 10), and the IP address of the target S-GW-U or eNB (or RAN 10). At the step S609, based on the information received from the target P-GW-C 211, the target P-GW-U 212 may add a new forwarding entry in its forwarding table for the user traffic. At the step S610, the target P-GW-U 212 may reply the target P-GW-C 211 with a message to confirm that the related information has been received and the forwarding rules have been installed for the user traffic. In other words, a user addition response message indicating that the target P-GW-U 212 is ready for handling the user plane traffic for the UE 100 is transmitted from the target P-GW-U 212 to the target P-GW-C 211.

At the step S611, the target P-GW-C 211 may send a request message to its upstream SDNC 301 directly or indirectly via an intermediate network function (such as PCRF 213) to establish a DL traffic steering policy for the UE 100. The message may comprise at least one of the following information (but not limited to): UE 100's IP address allocated by the target P-GW-C 211, the ID/IP address of the target P-GW-U 212 selected for the UE 100, and the related traffic description information. At the step S612, based on the information received from the target P-GW-C 211, the SDNC 301 may update the traffic steering policy for the user DL traffic, e.g. to steer related user DL traffic from the serving P-GW-U 202 to the target P-GW-U 212, by providing the OFS 302 with the updated forwarding rules which may comprise the ID/IP of the target P-GW-U 212 and/or the DL user traffic description information.

At the step S613, the SDNC 301 may reply the target P-GW-C 211 with a message to confirm that the related information has been received and the DL traffic has been successfully switched to the target P-GW-U 212.

At the step S614, the target P-GW-C 211 may reply the UE 100 with a response message via some other intermediate network function(s) to confirm that the handover is success. At the step S615, the target P-GW-C 211 may reply the serving P-GW-C 201 with a response message to confirm the P-GW-C relocation is success. At the Step S616, after receipt of the response message from the target network slice #2 20-2 (or the target P-GW-C 211), the UE 100 may reply the source network slice #1 20-1 or the serving P-GW-C 201 with a response message to confirm that it has been switched to the target network slice #2 20-2.

At the step S617, after receipt of the response message from the target P-GW-C 211 and the response message from the UE 100, the serving P-GW-C 201 may send a request message to its upstream SDNC 301 directly or indirectly via an intermediate network function (such as PCRF 203) to release the DL traffic steering policy for the UE 100. The message may comprise at least one of (but not limited to): UE 100's IP address allocated by the serving P-GW-C 201, ID/IP address of the serving P-GW-U 202, and the related traffic description information. At the step S618, based on the information received from the serving P-GW-C 201, the SDNC 301 may update the traffic steering policy for the user DL traffic by removing the traffic steering policy for the user equipment 100.

At the step S619, the SDNC 301 may reply the serving P-GW-C 201 with a response message to confirm that the UE related traffic steering policy has been deleted. At the step S620, the serving P-GW-C 201 may instruct the serving P-GW-U 202 to remove the UE related forwarding entry via a request message. At the step S621, based on the instruction received from the serving P-GW-C 201, the serving P-GW-U 202 may delete the UE related forwarding entry from its forwarding table. At the step S622, the serving P-GW-U 202 may reply the serving P-GW-C 201 with a message to confirm that the related UE forwarding entry has been removed.

At the step S623, through the bearers established with the target user plane function, e.g. the target P-GW-U 212, the UE 100 may send an application layer service request (such as an HTTP request) to require certain information from the application server 40 or report certain information to the application server 40 (such as tactile internet application server). At the step S624, the application server 40 may reply the UE 100 with an application layer response message to provide required information.

In this embodiment of FIG. 3, the user plane traffic of the user equipments 100 may be routed through the target P-GW-U 212 rather than the serving P-GW-U 202 while the control plane traffic may be routed through the target P-GW-C 211 rather than the serving P-GW-C 201. In this way, both of the control plane traffic and the user plane traffic can be handed over to new anchor nodes which are more appropriate for the user equipments. Further, the proposed architecture is consistent with the existing 3GPP network architecture, e.g. control plane and user plane separation and the evolution trend to 5G sliced networks. Also, the solution is simple and feasible from implementation perspective, e.g. only enhancement on existing interfaces and network functions.

Figure 4:
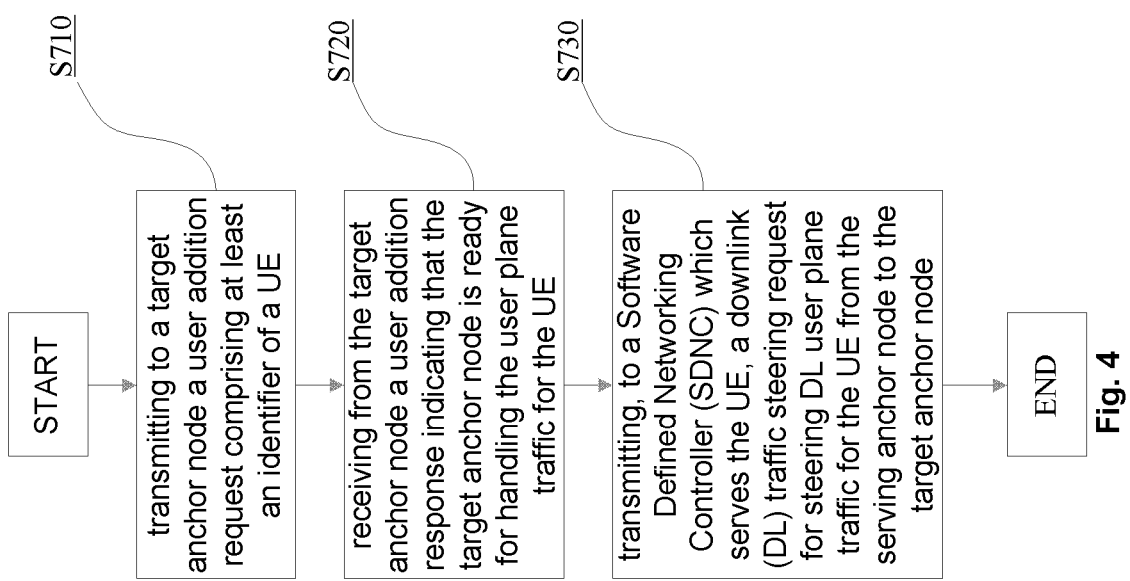
FIG. 4 is a flow chart showing a method performed in a communication network for handing over a user equipment (UE) from a serving anchor node to a target anchor node for user plane traffic according to an embodiment of the present disclosure.

Next, a method 700 performed in a communication network 1 for handing over a user equipment (UE) 100 from a serving anchor node 202 to a target anchor node 212 for user plane traffic will be described with reference to FIG. 4. As shown in FIG. 4, the method 700 begins with the step S710 where a user addition request comprising at least an identifier of the UE 100 may be transmitted to the target anchor node 212.

At the step S720, a user addition response indicating that the target anchor node 212 is ready for handling the user plane traffic for the UE may be received from the target anchor node 212. At the step S730, a downlink (DL) traffic steering request for steering DL user plane traffic for the UE 100 from the serving anchor node 202 to the target anchor node 212 may be transmitted to a Software Defined Networking Controller (SDNC) which serves the UE 100.

In an embodiment, the method 400 may further comprise a step of transmitting, to a Mobility Management Entity (MME) 204 which serves the UE 100, an uplink (UL) traffic steering request for steering UL user plane traffic for the UE 100 from the serving anchor node 202 to the target anchor node 212. In an embodiment, before the transmission of the user addition request, the method 400 may further comprise a step of determining whether the handover is necessary or not based on at least one of the current location of the UE 100, mobility history information of the UE 100, location information for an application server 40 which is serving the UE 100, service requirements on latency, and an instruction from an Operations Support System (OSS)/Business Support System (BSS). In an embodiment, before the transmission of the user addition request, the method 400 may further comprise a step of determining the target anchor node 212 based on at least one of the current location of the UE 100, mobility history information of the UE 100, location information for an application server 40 which is serving the UE 100, service requirements on latency, and an instruction from an Operations Support System (OSS)/Business Support System (BSS).

In an embodiment, the user addition request may further comprise at least one of: IP address of the UE 100, TEID allocated by the serving P-GW-C or a network element 201 or the MME 204, and the IP address of the serving anchor node 202 or a serving eNodeB of the UE 100. In an embodiment, the traffic steering requests may comprise at least one of: IP address of the UE 100, TEID of the target anchor node 212, associated TEID of the serving anchor node 202, ID or IP address of the target anchor node 212, and description information for DL user plane traffic. In an embodiment, the method 400 may further comprise a step of receiving, from the SDNC 301, a DL traffic steering response indicating that the DL user plane traffic has been steered to the target anchor node 212. In an embodiment, the method 400 may further comprise a step of receiving, from the MME 204, a UL traffic steering response indicating that the UL user plane traffic has been steered to the target anchor node 212. In an embodiment, after the transmission of the UL traffic steering request to the MME 204, the method 400 may further comprise: transmitting to the serving anchor node 202 a user deletion request comprising at least the identifier of the UE 100 and a step of receiving from the serving anchor node 202 a user deletion response indicating that the serving anchor node 202 does not serve the UE 100 any longer.

In an embodiment, after the transmission of the UL traffic steering request to the MME 204 and before the transmission of the user deletion request, the method 400 may further comprise a step of receiving from the serving anchor node 202 an indicator indicating that the handover is success. In an embodiment, before the transmission of the user addition request, the method 400 may further comprise a step of receiving from another network element a relocation request for control plane traffic for the UE 100, and after the reception of the DL traffic steering response, the method 400 may further comprise a step of transmitting to the other network element a relocation response to indicate that the relocation is success.

In an embodiment, before the transmission of the user addition request, the method 400 may further comprise a step of receiving from the UE 100 a Packet Data Network (PDN) connection request, and after the reception of the DL traffic steering response, the method 400 may further comprise a step of transmitting to the UE 100 a PDN connection response to indicate that the handover is success.

Figure 5:
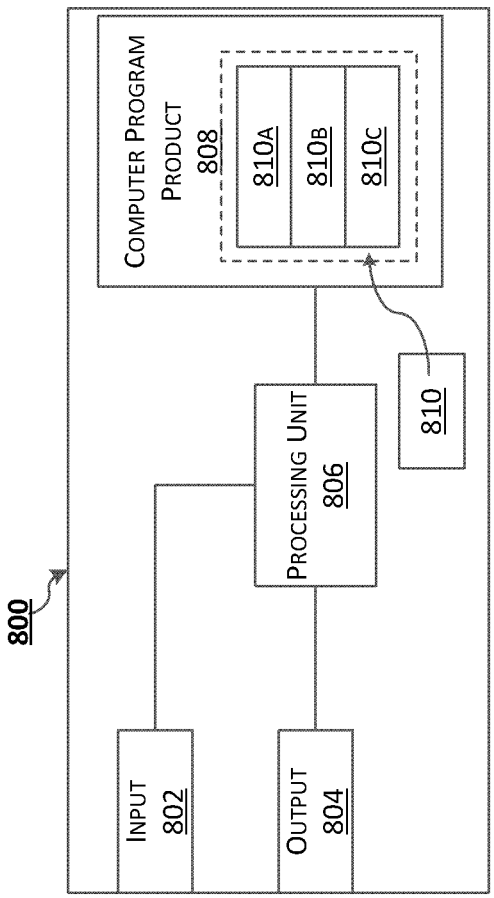
FIG. 5 is a block diagram schematically showing an exemplary arrangement which may be used in a network element according to an embodiment of the present disclosure.

FIG. 5 schematically shows an embodiment of an arrangement 800 which may be used in a network element according to an embodiment of the present disclosure.

Comprised in the arrangement 800 are a processing unit 806, e.g., with a Digital Signal Processor (DSP). The processing unit 806 may be a single unit or a plurality of units to perform different actions of procedures described herein. The arrangement 800 may also comprise an input unit 802 for receiving signals from other entities, and an output unit 804 for providing signal(s) to other entities. The input unit 802 and the output unit 804 may be arranged as an integrated entity or as separate entities.

Furthermore, the arrangement 800 may comprise at least one computer program product 808 in the form of a non-volatile or volatile memory, e.g., an Electrically Erasable Programmable Read-Only Memory (EEPROM), a flash memory and/or a hard drive. The computer program product 808 comprises a computer program 810, which comprises code/computer readable instructions, which when executed by the processing unit 806 in the arrangement 800 causes the arrangement 800 and/or the network element in which it is comprised to perform the actions, e.g., of the procedure described earlier in conjunction with FIGS. 1-4 or any other variant.

The computer program 810 may be configured as a computer program code structured in computer program modules 510A-510C. Hence, in an exemplifying embodiment when the arrangement 800 is used in the network element (or the P-GW-C 201 or 211), the code in the computer program of the arrangement 800 includes: a request transmission module 810A for transmitting to the target anchor node 212 a user addition request comprising at least an identifier of the UE 100. The code in the computer program further includes a response receiving module 810B for receiving from the target anchor node 212 a user addition response indicating that the target anchor node 212 is ready for handling the user plane traffic for the UE. The code in the computer program further includes a steering request transmission module 810C for transmitting, to a Software Defined Networking Controller (SDNC) 301 which serves the UE 100, a downlink (DL) traffic steering request for steering DL user plane traffic for the UE 100 from the serving anchor node 202 to the target anchor node 212.

The computer program modules could essentially perform the actions of the flow illustrated in FIGS. 1-4, to emulate the network element 201 or the network element 211. In other words, when the different computer program modules are executed in the processing unit 806, they may correspond to different modules in the network element 201 or the network element 211.

Although the code means in the embodiments disclosed above in conjunction with FIG. 5 are implemented as computer program modules which when executed in the processing unit causes the arrangement to perform the actions described above in conjunction with the figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the UE.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

| Abbreviation | Definition |
| --- | --- |
| AF | Application Function |
| BSS | Business Support System |
| CAPEX | Capital Expenditure |
| CDN | Content Distribution Network |
| CN | Core Network |
| C-plane | Control Plane |
| CUPS | Control and User Plane Separation |
| DÉCOR | Dedicated Core |
| DL | Down Link |
| EPC | Evolved Packet Core |
| HSS | Home Subscriber Server |
| MME | Mobility Management Entity |
| MTC | Machine-Type Communications |
| NFV | Network Functions Virtualization |
| NGMN | Next Generation Mobile Networks |
| OAM | Operation and Maintenance |
| OPEX | Operating Expense |
| OF | Open Flow |
| OFS | Open Flow Switch |
| OSS | Operations Support System |
| OTT | Over The Top |
| PCRF | Policy and Charging Rules Function |
| PDN | Packet Data Network |
| P-GW | PDN Gateway |
| P-GW-C | PDN Gateway Control plane function |
| P-GW-U | PDN Gateway User plane function |
| RAN | Radio Access Network |
| RAT | Radio Access Technology |
| SCEF | Service Capability Exposure Function |
| S-GW | Serving Gateway |
| S-GW-C | Serving Gateway Control plane function |
| S-GW-U | Serving Gateway User plane function |
| SDN | Software Defined Networking |
| SDNC | SDN controller |
| UE | User Equipment |
| UL | Uplink |
| U-plane | User Plane |

What is claimed is:

1. A method performed in a communication network for handing over user plane traffic for a user equipment (UE) from a serving anchor node to a target anchor node, the method comprising:
   determining whether the handover is necessary or not based on at least one of the following: current location of the UE; mobility history information of the UE; location information for an application server which is serving the UE; service requirements on latency; and an instruction from an Operations Support System (OSS)/Business Support System (BSS);
   transmitting, to the target anchor node, a user addition request comprising an identifier of the UE;
   receiving, from the target anchor node, a user addition response indicating that the target anchor node is ready for handling the user plane traffic for the UE; and
   transmitting, to a Software Defined Networking Controller (SDNC) which serves the UE, a downlink (DL) traffic steering request for steering DL user plane traffic for the UE from the serving anchor node to the target anchor node.

2. The method according to claim 1, further comprising transmitting, to a Mobility Management Entity (MME) which serves the UE, an uplink (UL) traffic steering request for steering UL user plane traffic for the UE from the serving anchor node to the target anchor node.

3. The method according to claim 1, further comprising, before transmitting the user addition request, determining the target anchor node based on at least one of the following: current location of the UE; mobility history information of the UE; location information for an application server which is serving the UE; service requirements on latency; and an instruction from an Operations Support System (OSS)/Business Support System (BSS).

4. The method according to claim 1, wherein the user addition request further comprises at least one of the following: Internet Protocol (IP) address of the UE; TEID allocated by the network element or the MME; and IP address of either the serving anchor node or a serving eNodeB of the UE.

5. The method according to claim 1, wherein the DL traffic steering request comprises at least one of the following: Internet Protocol (IP) address of the UE; TEID of the target anchor node; associated TEID of the serving anchor node; ID or IP address of the target anchor node; and description information for DL user plane traffic.

6. The method according to claim 1, further comprising receiving, from the SDNC, a DL traffic steering response indicating that the DL user plane traffic has been steered to the target anchor node.

7. The method according to claim 2, further comprising receiving, from the MME, a UL traffic steering response indicating that the UL user plane traffic has been steered to the target anchor node.

8. The method according to claim 2, further comprising, after transmitting the UL traffic steering request to the MME:
   transmitting, to the serving anchor node, a user deletion request comprising at least the identifier of the UE; and
   receiving, from the serving anchor node, a user deletion response indicating that the serving anchor node does not serve the UE any longer.

9. The method according to claim 8, further comprising, after transmitting the UL traffic steering request to the MME and before transmitting the user deletion request, receiving from the serving anchor node an indicator indicating that the handover is success.

10. The method according to claim 6, further comprising:
    before transmitting the user addition request, receiving from another network element a relocation request for control plane traffic for the UE; and
    after receiving the DL traffic steering response, transmitting to the other network element a relocation response to indicate that the relocation is success.

11. The method according to claim 6, wherein the method further comprises:
    before transmitting the user addition request, receiving from the UE a Packet Data Network (PDN) connection request; and
    after receiving the DL traffic steering response, transmitting to the UE a PDN connection response to indicate that the handover is success.

12. A network element, of a communication network, configured to hand over user plane traffic for a user equipment (UE) from a serving anchor node to a target anchor node for, the network element comprising:
    at least one processor; and
    a memory storing computer-executable instructions that, when executed by the at least one processor, configure the network element to:
       determine whether the handover is necessary or not based on at least one of the following: current location of the UE; mobility history information of the UE; location information for an application server which is serving the UE; service requirements on latency; and an instruction from an Operations Support System (OSS)/Business Support System (BSS);
       transmit, to the target anchor node, a user addition request comprising an identifier of the UE;
       receive, from the target anchor node, a user addition response indicating that the target anchor node is ready for handling the user plane traffic for the UE; and
       transmit, to a Software Defined Networking Controller (SDNC) which serves the UE, a downlink (DL) traffic steering request for steering DL user plane traffic for the UE from the serving anchor node to the target anchor node.

13. The network element according to claim 12, wherein execution of the instructions further configures the network element to:
    transmit, to a Mobility Management Entity (MME) which serves the UE, an uplink (UL) traffic steering request for steering UL user plane traffic for the UE from the serving anchor node to the target anchor node.

14. The network element according to claim 12, wherein execution of the instructions further configures the network element to, before transmitting the user addition request, determine the target anchor node based on at least one of the following: current location of the UE, mobility history information of the UE; location information for an application server which is serving the UE; service requirements on latency; and an instruction from an Operations Support System (OSS)/Business Support System (BSS).

15. The network element according to claim 12, wherein execution of the instructions further configures the network element to receive, from the SDNC, a DL traffic steering response indicating that the DL user plane traffic has been steered to the target anchor node.

16. The network element according to claim 13, wherein execution of the instructions further configures the network element to receive, from the MME, a UL traffic steering response indicating that the UL user plane traffic has been steered to the target anchor node.

17. The network element according to claim 13, wherein execution of the instructions further configures the network element to, after transmitting the UL traffic steering request to the MME:
    transmit, to the serving anchor node, a user deletion request comprising at least the identifier of the UE; and
    receive, from the serving anchor node, a user deletion response indicating that the serving anchor node does not serve the UE any longer.

18. A non-transitory, computer-readable medium storing computer-executable instructions that, when executed by at least one processor comprising a network element of a communication network, configure the network element to perform operations corresponding to the method of claim 1.

* * * * *